United States Patent Office 2,914,541
Patented Nov. 24, 1959

2,914,541

3-METHYLENE-CYCLOBUTANES

Harry Norman Cripps, Hockessin, Del., assignor to E. I. du Pont de Nemours and Company, Wilmington, Del., a corporation of Delaware No Drawing. Application September 2, 1955
Serial No. 532,376

6 Claims. (Cl. 260—346.3)

This invention relates to cyclic organic compounds. More particularly, it relates to new unsaturated cyclic organic compounds having certain functional groups, and to a method for their preparation.

This is a continuation-in-part of U.S. application Serial No. 476,585, filed December 20, 1954 by H. N. Cripps, and now abandoned.

Unsaturated compounds have certain properties which make them useful in various applications. One such property which is responsible for their widespread commercial use is the ability of many unsaturated compounds to be polymerized to valuable high molecular weight products. While the known polymers have many characteristics which are desirable for use in various applications there are some applications in which polymers having certain specific properties or combinations of properties would have increased utility.

This invention has as an object the preparation of new unsaturated compounds which can be polymerized and copolymerized with other polymerizable monomers to form products of unusual or improved properties. A further object is the synthesis of new unsaturated cyclic compounds having certain functional groups which are useful as chemical intermediates. Another object is the preparation of condensation polymer intermediates. Other objects of the invention will appear by a consideration of the following description of certain embodiments thereof.

These objects are accomplished by the present invention of an adduct of an allene having two hydrogen atoms on at least one of the terminal allene carbons with an equimolar amount of from one to two moles of an olefin having an activating group on at least one of the doubly bonded carbons. These products are of two classes: those from addition of one mole of olefin to one mole of allene, and those from addition of two moles of olefin to two moles of allene.

The products resulting from addition of one mole of the olefin to one mole of the allene are methylenecyclobutanes in which the annular carbon opposite the one to which the methylene group is attached (i.e., the carbon in the 3-position with the methylene group attached to the carbon in the 1-position) carries an activating group, which activating group is characterized in that it is united to one annular carbon of the cyclobutane ring by a carbon which is in turn attached to another atom by a multiple bond. A preferred group of the compounds of this class is that in which any substituents on the cyclobutane ring, in addition to the aforementioned activating group, are hydrocarbon or are activating groups of the type defined above. Especially preferred methylenecyclobutanes are those in which at least one of the carbons adjacent to the one carrying the methylene group is unsubstituted.

The products resulting from the addition of two moles of the olefin to two moles of allene are $\Delta^{9,10}$-octalins having an even number, from 2 to 4, of activating groups on annular carbons, each activating group being on singly bonded carbon separated by one carbon from doubly bonded carbon and there being the same number of activating groups on each six-membered ring, each carbon adjacent to the doubly bonded carbons bearing two hydrogens, the activating groups being attached to annular carbons of the octalin nucleus by carbon attached by a multiple bond to another atom. A preferred group of the compounds of this class is that in which any remaining valences of nuclear carbon are satisfied by hydrogen, hydrocarbon groups, or activating groups of the type defined above.

The process of this invention is carried out by heating, in the absence of a polymerization initiator, a mixture of an allene having at least one of the terminal carbon atoms of the allene group, $>C=C=C<$, unsubstituted and a substituted ethylene having an activating group attached to one of the doubly bonded carbons of the ethylenic linkage to a temperature of 150°–250° C. The activating group in the substituted ethylene reactant is characterized in the same manner as the activating group in the products defined above. That is, it is a group attached to one of the olefinic carbons by a carbon atom that is in turn attached to another atom by a multiple bond. The reaction involving the formation of a methylenecyclobutane is illustrated by the following equation for the reaction of allene with acrylonitrile:

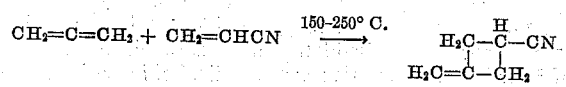

The reaction involving the formation of a substituted $\Delta^{9,10}$-octalin is illustrated by the following equations for the reaction of allene with acrylonitrile:

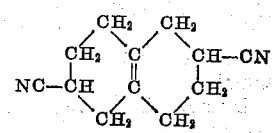

and/or

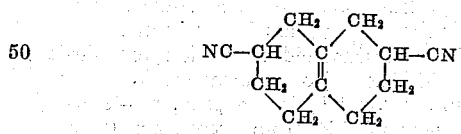

Both classes of the products of this invention are obtained from the allene and the substituted ethylene under the general reaction conditions defined above; however, the yield of each type of product is influenced by the particular reaction conditions employed. Best yields of the methylenecyclobutane products are obtained when an excess, e.g., a 100% excess, of the substituted ethylene reactant is employed. On the other hand, best yields of the polysubstituted $\Delta^{9,10}$-octalins are obtained when equimolar amounts of the reactants, or a slight excess of allene, are employed.

Preferably the reaction is carried out at a temperature of 175° to 225° C., and in the presence of an addition polymerization inhibitor. Within the broad temperature operating range of 150° to 250° C., the lower temperatures, i.e., 150°° to 200° C., generally favor the reaction leading to the formation of methylenecyclobutanes. Consequently, when best yields of this class of product are desired, temperatures below 200° C. are generally preferred. On the other hand, operating temperatures above 200° C. generally favor the formation of the polysubstituted $\Delta^{9,10}$-octalins. Consequently, when best yields of this class of product are desired, temperatures above 200° C. are preferred.

The pressure under which this reaction is carried out is not critical. Good results are obtained when the reactants are heated in a closed container under the autogenous pressure developed by the reactants under the operating conditions.

The reaction vessel can be constructed of any material which is inert to the reactants and is capable of withstanding the operating pressures. Reaction vessels made of glass, stainless steel and glass-lined steel are quite satisfactory.

The reaction time can be varied widely, times ranging from 2 to 24 hours or more at 150° C. to 250° C. are operable. Very good results are obtained in reaction periods ranging from 4 to 16 hours.

Reactants which are commercially available in the grades used for polymerization are satisfactory for use in the process of this invention. However, best results are obtained when the allene is relatively pure.

The process and products of this invention are illustrated in further detail in the following examples, in which the proportions of ingredients are expressed in parts by weight unless otherwise noted.

*Example I.—Preparation of 3-methylenecyclobutanecarbonitrile*

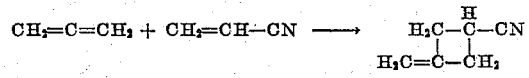

A mixture of 53.0 parts of acrylonitrile, 20.0 parts of allene and 1.0 part of hydroquinone is heated in a closed stainless steel reaction vessel for 16 hours at 175° C. with continuous shaking. After cooling and bleeding off the unreacted gaseous allene, the liquid residue amounts to 56.8 parts. On distillation there is obtained 3.7 parts of 3-methylenecyclobutanecarbonitrile, boiling point 70.5–72.5° C./29 mm., and refractive index, $n_D^{25}$, 1.4600.

*Analysis.*—Calcd. for $C_6H_7N$: C, 77.3%; H, 7.6%; N, 15.1%; Mol. wt., 93.1; Unsaturation (C=C), 0.0215 g. $H_2$/g. sample; Unsaturation (1 C=C and 1 C≡N), 0.0645 g. $H_2$/g. sample. Found: C, 77.79%; 77.90%; H, 7.63%; 7.65%; N, 14.39%; 14.41%; Mol. Wt. 93, 94.

Unsaturation (1C=C), 0.0236, 0.0230 g. $H_2$/g. sample.

Unsaturation (C=C and C≡N), 0.0696, 0.0713 g. $H_2$/g. sample.

The infrared spectrum obtained on 3-methylenecyclobutanecarbonitrile shows absorption for methylene groups at 5.95 and 11.30 microns and absorption for nitrile groups at 4.45 microns. Proton magnetic resonance measurements show a vinyl hydrogen peak, a —CH$_2$— hydrogen peak, and an HCX proton resonance (where X is an electronegative group) of relative intensities 2:4:1 which are in agreement with the 3-methylenecyclobutanecarbonitrile structure.

The 3-methylenecyclobutanecarbonitrile of Example I is converted to 3-methylcyclobutanecarboxylic acid by hydrogenation in the presence of palladium oxide catalyst, followed by saponification with aqueous alcoholic sodium hydroxide. The free acid, after distillation through an efficient fractionating column, boils at 108–108.5° C./18 mm. and has a refractive index, $n_D^{25}$, of 1.4350–1.4351.

*Analysis.*—Calcd. for $C_6H_{10}O_2$: C, 63.2%; H, 8.8%; N.E. 114.2. Found: C, 63.60%; H, 8.97%; N.E. 114.5.

The 3-methylcyclobutanecarboxylic acid is converted to the acid chloride by treatment with thionyl chloride and the acid chloride is then reacted with aniline to form 3-methylcyclobutanecarboxanilide. This anilide, after recrystallization from aqueous ethanol in the form of pale yellow plates, melts at 127–128° C. The melting point of 3-methylcyclobutanecarboxanilide reported in the literature is 127° C.

*Analysis.*—Calcd. for $C_{12}H_{15}NO$: N, 7.40%. Found: N, 7.44%.

*Example II.—Preparation of 3-methylenecyclobutanecarbonitrile and 2,6(or 7)-dicyano-$\Delta^{9,10}$-octalin*

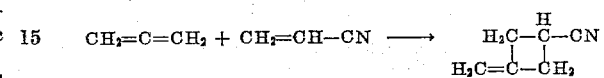

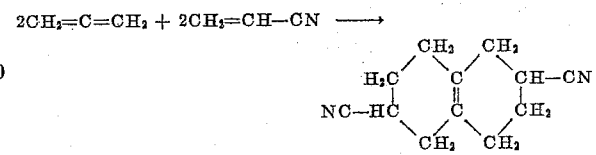

and/or

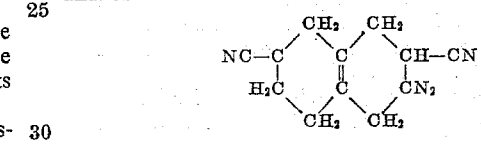

A mixture of 53 parts of acrylonitrile, 20 parts of allene and 1 part of hydroquinone is heated in a stainless steel reaction vessel at autogenous pressure for 16 hours at 200° C. The reaction product is isolated as described in Example I, and there is obtained 20.9 parts (corresponding to a 45.5% yield based on the allene charged) of 3-methylenecyclobutanecarbonitrile boiling at 59–62° C./17.5 mm. There is obtained as a residue from the distillation of the 3-methylenecyclobutanecarbonitrile 11.1 parts of crude 2,6(or 7)-dicyano-$\Delta^{9,10}$-octalin. After sublimation and crystallization from a mixture of 30 parts (by volume) of ethyl acetate and 25 parts of cyclohexane, there iso btained 5.4 parts of product melting at 143.5–144.5° C.

*Analysis.*—Calcd. for $C_{12}H_{14}N_2$: C, 77.3%; H, 7.6%; N, 15.1%; Mol. Wt. 186.2; Quant. Hydg. (one C=C and two C≡N), 0.0539 g. hydrogen/g. sample. Found: C, 76.35%; H, 7.51%; N, 15.04%; Mol. Wt. 175, 175; Quant. Hydg., 0.0499, 0.0578 g. hydrogen/g. sample.

The infrared absorption spectrum of this purified product shows a strong nitrile band at 4.45 microns. The absence of the carbon-carbon double bond absorption is indicative of a symmetrical structure.

Saponification of 10 parts of the purified 2,6-(or 7)-dicyano-$\Delta^{9,10}$-octalin with sodium hydroxide in an ethanol-water mixture, followed by acidification, yields 13.7 parts of isomeric acids. Fractional recrystallization of the crude acids from mixtures of dimethylformamide and water yields two acids: acid I, M.P. more than 300° C. (softens at 248–278° C.), acid II, M.P. 248–250° C. (softens at 211° C.).

*Analysis.*—Calcd. for $C_{12}H_{16}O_4$: C, 64.27%; H, 7.19% N.E., 112.2. Found: Acid I—C, 64.09%; H, 7.16%; N.E., 118.1. Acid II—C, 64.32%; H, 7.22%; N.E., 114.7.

The methyl esters of these isomeric acids are prepared by heating 7.72 parts of the mixture of acids obtained above, 200 parts of anhydrous methanol, and 1 part of p-toluenesulfonic acid under reflux for about 12 hours. The crude methyl esters, amounting to 7.2 parts, corresponding to a yield of 83.2%, are isolated from the reaction mixture as a pale yellow viscous oil.

A heat-resistant glass reaction tube six inches long and one inch in diameter is packed with an intimate mixture of 2 parts of 10% palladium-on-charcoal and 8 parts of six-mesh charcoal chips, and the tube is electrically heated. The methyl esters prepared as described in the preceding paragraph (6.46 parts) and a slow stream of dry carbon dioxide are passed downward through the tube heated at 350°–400° C. during a period of one hour. The off gases are passed through aqueous sodium hydroxide solution to absorb the carbon dioxide, and the hydrogen evolved is measured with a wet-test meter, 2.2 liters at standard temperature and pressure being obtained. The solid product, amounting to 1.55 parts, is identified as naphthalene by a mixed melting point with an authentic specimen, by odor and by its ultraviolet absorption spectrum.

*Example III.—Preparation of 3-methylenecyclobutanecarbonitrile and 2,6(or 7)-dicyano-$\Delta^{9,10}$-octalin*

A mixture of 53 parts of acrylonitrile, 40 parts of allene, 88 parts of benzene, and 1 part of hydroquinone is heated in a stainless steel reaction vessel under autogenous pressure at 225° C. for four hours. After removal of the benzene and 14.1 parts of 3-methylenecyclobutanecarbonitrile (B.P. 68–69.5° C./29 mm.) by distillation, there remains 55.1 parts of crude 2,6(or 7)-dicyano-$\Delta^{9,10}$-octalin. After recrystallization from a mixture of 100 parts (by volume) of ethyl acetate and 135 parts of cyclohexane, this product melts at 139–140° C.

*Example IV.—Preparation of 1-methyl-3-methylenecyclobutanecarbonitrile and 2,6(or 7)-dicyano-2,6(or 7)-dimethyl-$\Delta^{9,10}$-octalin*

A mixture of 201 parts of methacrylonitrile, 20 parts of allene and 2 parts of hydroquinone is heated at 225° C. for 8 hours as described in Example I. After working up the reaction mixture as described in that example there is obtained 31.7 parts of 1-methyl-3-methylenecyclobutanecarbonitrile, boiling at 58–58.5° C./21 mm., $n_D^{25}$, 1.4453.

*Analysis.*—Calcd. for $C_7H_9N$: C, 78.46%; H, 8.47%; N, 13.07%; Quant. Hydrog., 0.051 g. $H_2$/g. sample; Mol. Wt., 107.2. Found: C, 78.48%; H, 8.54%; N, 12.51%; Quant. Hydrog., 0.059 g. $H_2$/g. sample; Mol. Wt. 95; 0.060 g. $H_2$/g. sample; Mol. Wt. 97.

The infrared spectrum shows terminal methylene absorption at 5.93μ and 11.25μ, nitrile absorption at 4.48μ and methyl absorption at 7.25μ.

The residue from the distillation of 1-methyl-3-methylenecyclobutanecarbonitrile contains 2,6(or 7)-dicyano-2,6(or 7)-dimethyl-$\Delta^{9,10}$-octalin.

By substituting for the acrylonitrile and methacrylonitrile in Examples I, II, III and IV equivalent amounts of α-ethylacrylonitrile and maleic dinitrile, there can be obtained 1-ethyl-3-methylenecyclobutanecarbonitrile and 2,6(or 7)-dicyano-2,6(or 7)-diethyl-$\Delta^{9,10}$-octalin, and 3-methylenecyclobutane-1,2-dicarbonitrile and 2,3,6,7-tetracyano-$\Delta^{9,10}$-octalin, respectively.

*Example V.—Copolymerization of 3-methylenecyclobutanecarbonitrile with styrene*

A mixture of 5.0 parts of styrene, 3 parts of 3-methylenecyclobutanecarbonitrile, 57 parts of anhydrous thiophene-free benzene and 0.1 part of benzoyl peroxide is heated under reflux in a nitrogen atmosphere for 22¾ hours. The resultant solution is poured into 159 parts of methanol. The precipitated polymer is removed by filtration, washed with methanol, and dried. The dry polymer amounts to 3.75 parts (47% conversion) and contains 0.7% N. This indicates that the polymer contains about 4.7% of 3-methylenecyclobutanecarbonitrile.

*Example VI.—Copolymerization of 3-methylenecyclobutanecarbonitrile with maleic anhydride*

A mixture of 5.0 parts of 3-methylenecyclobutanecarbonitrile, 5.28 parts of maleic anhydride, 66 parts of benzene and 0.25 part of benzoyl peroxide is heated under reflux in an atmosphere of nitrogen. After 5 minutes of reflux, the reaction mixture becomes turbid and insoluble polymer begins to precipitate. After two hours and 25 minutes of reflux, the reaction mixture is cooled and diluted with 40 parts of acetone. The pale yellow polymer is separated by filtration, washed with benzene and dried. The dry polymer is a pale yellow powder which softens at 202° C. but does not melt at 300° C. The polymer dissolves readily in 14% $NH_4OH$ to give a yellow solution. The polymer is insoluble in cold water but slowly dissolves in hot water (about 1 part polymer in 100 parts of water) in the presence of a small amount of sulfuric acid. On analysis the dry polymer is found to contain 60.32% carbon, 5.23% hydrogen, and 6.82% nitrogen. This nitrogen content indicates that the polymer contains 45.2% of 3-methylenecyclobutanecarbonitrile.

*Example VII.—Preparation of methyl 1-methyl-3-methylenecyclobutanecarboxylate*

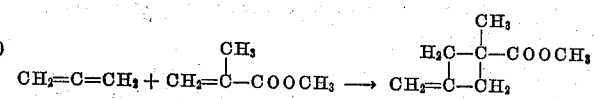

A mixture of 100 parts of methyl methacrylate, 20 parts of allene and 1 part of hydroquinone is heated at 200° C. for 8 hours in a closed reaction vessel of the type used in the preceding examples. Distillation of the reaction mixture yields 20 parts (25% of theory) of methyl 1-methyl-3-methylenecyclobutanecarboxylate boiling at 50–54° C./16 mm. and having a refractive index, $n_D^{25}$, of 1.4411–1.4423. On redistillation the major portion of the product boils at 54–55° C./15 mm.

*Analysis.*—Calcd. for $C_8H_{11}O_2$: C, 68.5%; H, 8.6%; Mol. wt. 140.2; Sap. Equiv., 140; Unsaturation, 0.0143 g. $H_2$/g. sample. Found: C, 68.89%; H, 8.73%; Mol. wt. 137; Sap. Equiv., 140.9, 139.3; Unsaturation, 0.0155, 0.0147 g. $H_2$/g. sample.

The infrared spectrum shows ester carbonyl absorption at 5.75 microns and terminal methylene absorption at 3.25, 5.95 and 11.4 microns.

*Example VIII.—Preparation of methyl 3-methylenecyclobutanecarboxylate*

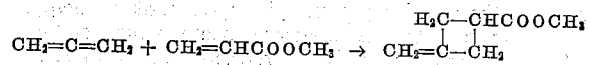

A mixture of 172 parts of methyl acrylate, 20 parts of allene and 1 part of phenothiazine is heated at 200° C. for 13 hours, by the procedure of Example VII. Most of the reaction product is a polymeric glassy mass. On distillation the reaction product yields 15.3 parts of liquid methyl 3-methylenecyclobutanecarboxylate, B.P. 56–59° C./20–21 mm.

*Analysis.*—Calcd. for $C_7H_9O_2$: C, 66.63%; H, 7.98%; Mol. wt., 126.2; Sap. Equiv., 126.2; Quant. Hydrog. 0.0158 g. $H_2$/g. sample. Found: C, 67.23%; H, 8.13%; Mol. wt., 121; Sap. Equiv., 124.8. C, 67.04; H, 8.18; Mol. wt., 120; Sap. Equiv., 125.0; Quant. Hydrog., 0.0175 g. $H_2$/g. sample; 0.0181 g. $H_2$/g. sample.

*Example IX.—Preparation of methyl 3-methylenecyclobutanecarboxylate and dimethyl $\Delta^{9,10}$-octalin-2,6 (or 7)-dicarboxylate*

$2CH_2=C=CH_2 + 2CH_2=CHCOOCH_3 \longrightarrow$

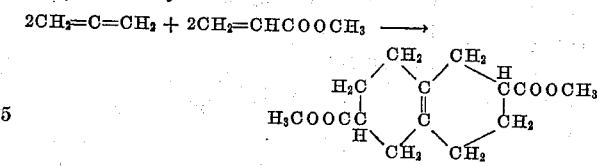

and/or

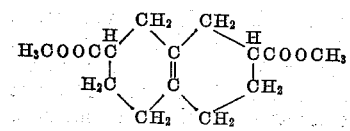

A mixture of 86.1 parts of methyl acrylate, 40 parts of allene, 88 parts of benzene and 2 parts of hydroquinone is heated under autogenous pressure at 215° C. for four hours. The reaction mixture is subjected to fractional distillation and there are obtained, after removal of benzene, 13.4 parts of crude methyl 3-methylenecyclobutanecarboxylate and 34.7 parts of dimethyl $\Delta^{9,10}$-octalin-2,6(or 7)-dicarboxylate boiling at 149–151° C./0.55–0.60 mm., and having a refractive index, $n_D^{25}$, of 1.4990–1.4970.

*Analysis.*—Calcd. for $C_{14}H_{20}O_4$: C, 66.64%; H, 7.99%; Mol. wt., 252. Found: C, 66.54%; H, 7.94%; Mol. wt., 222. C, 66.53%; H, 8.04%; Mol. wt. 226.

By replacing the methyl methacrylate and methyl acrylate of Examples VII, VIII and IX with equivalent quantities of n-butyl methacrylate and ethyl acrylate, and following the procedures of those examples, there can be obtained n-butyl 1-methyl-3-methylenecyclobutanecarboxylate and ethyl 3-methylenecyclobutanecarboxylate, respectively, and di-n-butyl 2,6(or 7)-dimethyl-$\Delta^{9,10}$-octalin-2,6(or 7)-dicarboxylate and diethyl-$\Delta^{9,10}$-octalin-2,6(or 7)-dicarboxylate, respectively.

*Example X.*—Preparation of diethyl 3-methylenecyclobutane-1,2-dicarboxylate and tetraethyl $\Delta^{9,10}$-octalin 2,3,6,7-tetracarboxylate

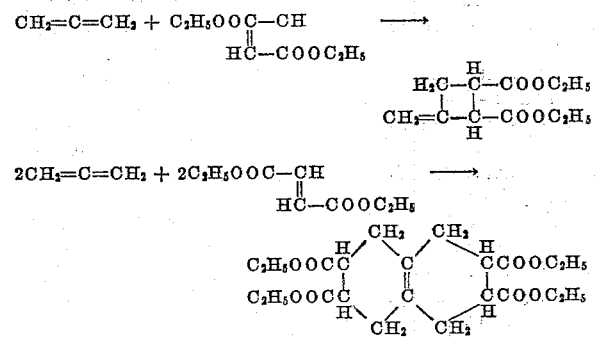

A mixture of 86.1 parts of diethyl fumarate, 10 parts of allene and 1 part of hydroquinone is heated under autogenous pressure at 200° C. for 13 hours in a reaction vessel of the type used in the preceding examples. Distillation of the reaction product yields 7.4 parts of diethyl 3-methylenecyclobutane-1,2-dicarboxylate boiling at 76–77° C./0.45 mm. and having a refractive index, $n_D^{25}$, of 1.4497–1.4484.

*Analysis.*—Calcd. for $C_{11}H_{16}O_4$: C, 62.5%; H, 7.60%; Mol. wt., 212.2; Sap. Equiv., 106.1: Unsaturation, 0.0095 g. $H_2$/g. sample. Found: C, 62.65%; H, 7.87%; Mol. wt., 205, 205; Sap. Equiv., 109; Unsaturation, 0.0111 g. $H_2$/g. sample; 0.0112 g. $H_2$/g. sample.

The residue from the above distillation of diethyl 3-methylenecyclobutane-1,2-dicarboxylate is a solid amounting to 11.6 parts. On recrystallization from methanol, white needles of tetraethyl $\Delta^{9,10}$-octalin-2,3,6,7-tetracarboxylate, melting at 128–135° C., are obtained.

*Analysis.*—Calcd. for $C_{22}H_{32}O_8$: C, 62.25%; H, 7.60%; Mol. wt., 424; Sap. Equiv., 106.1. Found: C, 62.34%; H, 7.63%; Mol. wt., 400, 405; Sap. Equiv., 106.

*Example XI.*—Preparation of tetraethyl $\Delta^{9,10}$-octalin-2,3,6,7-tetracarboxylate

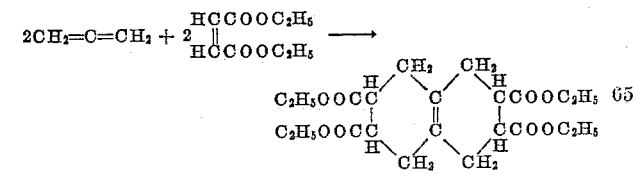

A mixture of 172 parts of ethyl maleate, 20 parts of allene, and 1 part of hydroquinone is heated at 225° C. for four hours in a stainless steel reaction vessel under the autogenous pressure developed. The reaction mixture is subjected to distillation and after removing a volatile fraction there is obtained a white solid residue amounting to 6.3 parts. After recrystallization from ethanol, the solid residue gives white needles of tetraethyl $\Delta^{9,10}$-octalin-2,3,6,7-tetracarboxylate, melting at 140.5–142.5° C.

*Analysis.*—Calcd. for $C_{22}H_{32}O_8$: C, 62.25%; H, 7.60%; Mol. wt., 424; Sap. Equiv., 106.1. Found: C, 62.71%; H, 7.66%; Mol. wt., 379, 387; Sap. Equiv., 104.

The tetraethyl $\Delta^{9,10}$-octalin-2,3,6,7-tetracarboxylate of this example is isomeric with that obtained from allene and diethyl fumarate, as described in Example X.

*Example XII.*—Preparation of diethyl 3-methylenecyclobutane-1,2-dicarboxylate

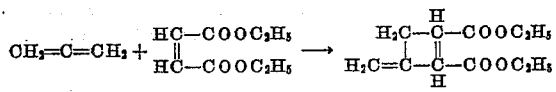

A mixture of 457 parts of ethyl maleate, 40 parts of allene and 1 part of hydroquinone is heated at autogenous pressure at 225° C. for 6 hours. After removing unreacted ethyl maleate from the reaction mixture by distillation under reduced pressure, the residue is distilled through an efficient fractionating column. There is obtained 17.9 parts of diethyl 3-methylenecyclobutane-1,2-dicarboxylate, boiling at 119–122° C./10 mm., and having a refractive index, $n_D^{25}$, of 1.4484.

*Analysis.*—Calcd. for $C_{11}H_{16}O_4$: C, 62.25%; H, 7.60%; Mol. wt., 212.2; Sap. Equiv., 106.1. Found: C, 61.61%, 61.26%; H, 7.61%, 7.46%; Mol. wt., 200, 210; Sap. Equiv., 101.3, 101.5.

The residue from the distillation of the diethyl 3-methylenecyclobutane-1,2-dicarboxylate amounts to 134 parts and is crude tetraethyl $\Delta^{9,10}$-octalin-2,3,6,7-tetracarboxylate.

When the diethyl fumarate and diethyl maleate of Examples X—XII are replaced by equivalent quantities of diethyl methylenemalonate, there can be obtained diethyl 3-methylenecyclobutane-1,1-dicarboxylate and tetraethyl $\Delta^{9,10}$-octalin-2,2,6,6 (or 7,7)-tetracarboxylate.

*Example XIII.*—Preparation of 1-methylene-3,3-diphenylcyclobutane

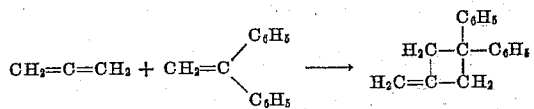

A mixture of 39.8 parts of 1,1-diphenylethylene, 10 parts of allene and 0.5 part of hydroquinone is heated for 8 hours at 200° C. under autogenous pressure in a reaction vessel of the type used in the preceding examples. Distillation of the reaction product yields 3.6 parts of 1-methylene-3,3-diphenylcyclobutane boiling at 99.5–106.° C./0.22–0.44 mm.

*Analysis.*—Calcd. for $C_{17}H_{16}$: C, 92.68% H, 7.32%; Mol. wt., 220.3; Unsaturation, 0.0091 g. $H_2$/g. sample. Found: C, 92.20%, 91.53%, 91.29%; H, 7.49%, 7.37%, 7.21%; Mol wt., 210, 210; Unsaturation, 0.0190, 0.0100 g. $H_2$/g. sample.

*Example XIV.*—Preparation of 1-methylene-3-phenylcyclobutane

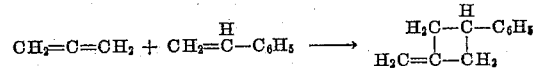

A mixture of 104.1 parts of styrene, 20 parts of allene and 1 part of hydroquinone is heated for 16 hours at 200° C. under autogenous pressure in a reaction vessel of the type used in the preceding examples. The resultant polymeric mass is exhaustively steam distilled and there is isolated about 1 part of 1-methylene-3-phenylcyclobutane. This compound boils at 87–93° C./21 mm. and has a refractive index, $n_D^{25}$, of 1.5327–1.5352.

*Analysis.*—Calcd. for $C_{11}H_{12}$: C, 91.69%; H, 8.39%; Mol. wt., 144.2; Unsaturation, 0.0139 g. $H_2$/g. sample. Found: C, 91.13% H, 8.56%; Mol. wt., 150; Unsaturation, 0.0141, 0.0145 g. $H_2$/g. sample.

When the 1,1-diphenylethylene and styrene of Examples XIII and XIV are replaced with equivalent quantities of α-methylstyrene, and the procedures of these examples repeated, there can be obtained 1-methyl-3-methylene-1-phenylcyclobutane and 2,6(or 7)-dimethyl-2,6(or 7)-diphenyl-Δ$^{9,10}$-octalin.

*Example XV.—Preparation of 3-methylene-2,2-dimethylcyclobutanecarbonitrile*

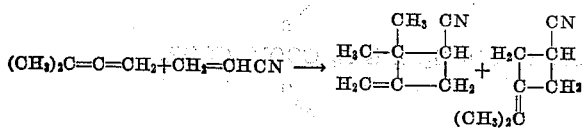

A mixture of 132 parts of 3-methylbutadiene-1,2(1,1-dimethylallene), 344 parts of acrylonitrile and 3.5 parts of phenothiazine is heated at 200° C. for 8 hours under autogenous pressure. The combined products from three such runs are submitted to steam distillation. The organic phase of the steam distillate is separated, dried over magnesium sulfate and freed of unreacted starting materials by distillation at atmospheric pressure. The residue consists largely of a mixture of isomeric substituted cyclobutanes and amounts to 403 parts. Distillation of this mixture gives 134 parts of 3-methylene-2,2-dimethyl-cyclobutane-1-carbonitrile, B.P. 111° C./100 mm., $n_D^{25}$, 1.4502 and 200 parts of 3-isopropylidenecyclobutane-1-carbonitrile, B.P. 138° C./100 mm., $n_D^{25}$, 1.4691. The assigned structures of these compounds are based on elemental analysis, quantitative hydrogenation studies, and infrared and proton magnetic resonance spectra.

When the dimethylallene of Example XV is replaced by equivalent quantities of 1-methylallene, 1,1-di-n-butylallene and 1-n-dodecylallene, there can be obtained 3-methylene-2-methylcyclobutanecarbonitrile, 3-methylene-2,2-di-n-butyl-cyclobutanecarbonitrile and 3-methylene-2-n-dodecylcyclobutanecarbonitrile, respectively.

*Example XVI.—Preparation of 3-methylenecyclobutane-1,2-dicarboxylic anhydride and Δ$^{9,10}$-octalin-2,3,6,7-tetracarboxylic anhydride*

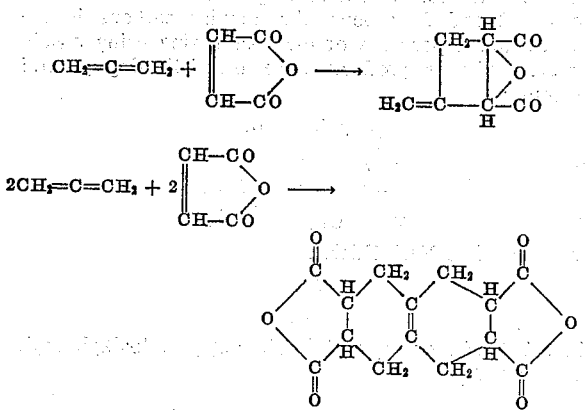

A mixture of 98.1 parts of maleic anhydride, 20.0 parts of allene, 176 parts of benzene and 0.5 part of hydroquinone is heated in a stainless steel vessel at 225° C. for 8 hours at autogenous pressure. The reaction mixture is filtered to separate 26.2 parts of yellow solid from the liquid portion of the mixture. The unreacted benzene and maleic anhydride are removed from the filtrate by distillation. Distillation of the residue gives 21.3 parts of 3-methylenecyclobutane-1,2-dicarboxylic anhydride that boils at 151–157° C./22 mm.

Analysis.—Calcd. for $C_7H_6O_3$: C, 60.87%; H, 4.38%; Mol. wt., 138.1 Sap. Equiv., 69.06; Quant. Hydrog., 0.0145 g. $H_2$/g. sample. Found: C, 60.69%, 61.19, 60.81; H, 4.88%, 4.70, 4.72; Mol. wt., 141, 157; Sap. Equiv., 68.4, 68.3; Quant. Hydrog., 0.0186 g. $H_2$/g. sample.

The infrared spectrum shows absorption at 5.4μ and 5.6μ for the anhydride group and 5.95μ and 11.0μ for the terminal methylene group.

The yellow solid filtered out of the orginal reaction mixture melts at 235–239° C. after sublimation. Recrystallization of this product from ethyl acetate yields small white needles of Δ$^{9,10}$-octalin-2,3,6,7-tetracarboxylic anhydride, melting at 239–240° C.

*Example XVII.—Preparation of 2-acetoxymethyl-3-methylene-cyclobutanecarbonitrile*

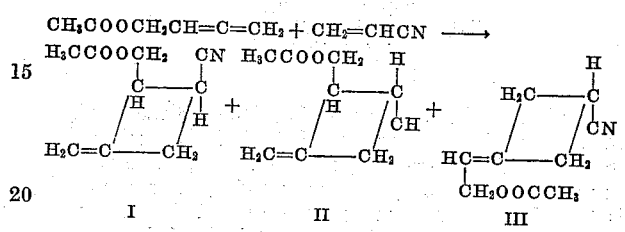

A mixture of 168 parts of 1-acetoxy-2,3-butadiene, 318 parts of acrylonitrile and 3.0 parts of phenothiazine is heated in a stainless steel reaction vessel under autogenous pressure at 200° C. for 8 hours. The liquid reaction product is separated from a small amount of amber solid and freed of unreacted acrylonitrile by distillation at atmospheric pressure. Distillation of the residual oil yields 148 parts of a product boiling at 144–165° C. at 21 mm. pressure.

Analysis.—Calcd. for $C_9H_{11}NO_2$: C, 65.43%; H, 61.71%; N, 8.48%. Found: C, 65.64%; H, 6.70%; N, 9.18%.

Hydrogenation of a sample of this reaction product over 10% palladium-on-carbon in absolute ethanol results in the formation of dihydro compounds boiling at 150–165° C. at 21 mm. (69.6% yield).

Analysis.—Calcd. for $C_9H_{13}NO_2$: C, 64.65%; H, 7.84%; N, 8.38%. Found: C, 64.94%; H, 7.64%; N, 9.33%.

Careful fractionation of the reaction product boiling at 144–165° C. gives the following fractions:

| Cut | Vol., ml. | B.P./20 mm., ° C. | $n_D^{25}$ |
|---|---|---|---|
| A | 5 | 0–144 | 1.4616 |
| B | 5 | 144–145 | 1.4652 |
| C | 5.5 | 145–152 | 1.4671 |
| D | 5 | 152–154 | 1.4705 |
| E | 5 | 154–158 | 1.4732 |
| F | 5 | 158–160 | 1.4751 |
| G | 5 | 160–161 | 1.4770 |
| H | 5 | 161 | 1.4772 |
| I | 4 | 161 | 1.4772 |

Individual fractions A–I are subjected to infrared analysis. The infrared absorption spectrum of cut A shows absorption at 5.95 and 11.20 microns, which is characteristic of the terminal methylene (C=CH$_2$) group of 2-acetoxymethyl-3-methylenecyclobutanecarbonitrile. These two bands progressively diminish in intensity from cut A to cut F and are absent in cuts G–I. In addition all the distillation cuts, A–I, show bands at 4.5 and 5.75 microns, which are characteristic of the cyano and ester carbonyl groups, respectively. It is evident from the wide boiling ranges of the crude reaction product and its dihydro derivatives that the reaction produces a mixture of compounds. The above infrared absorption data indicate that fractions A–F contain a mixture of the cis and trans isomers of 2-acetoxymethyl-3-methylenecyclobutanecarbonitrile (formulas I and II in the equation above), and the fractions G–I consist essentially of 3-(β-acetoxyethylidene) cyclobutanecarbonitrile (Formula III in the equation above).

Example XVIII.—Preparation of allene-cyclopentadiene adduct

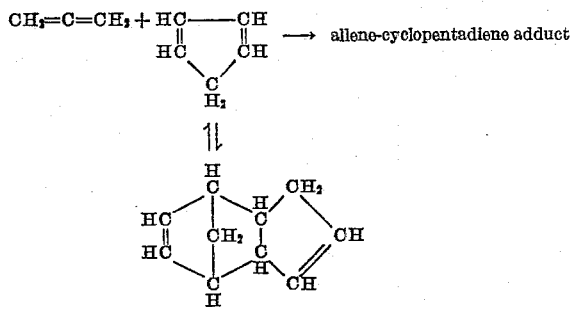

A mixture of 99.1 parts of dicyclopentadiene (which at the operating temperature of 200° C. is partially in the form of monomeric cyclopentadiene), 63 parts of pentane, 3.0 parts of hydroquinone and 60 parts of allene is heated under autogenous pressure at 200° C. for 6 hours. The liquid reaction product is freed from pentane and cyclopentadiene by distillation, and there is obtained on fractional distillation at reduced pressure 69 parts of allene-cyclopentadiene adduct boiling at 55–56° C./95 mm. and having a refractive index, $n_D^{25}$, of 1.4834.

*Analysis.*—Calcd. for $C_8H_{10}$: C, 90.5%; H, 9.5%; Quant. Hydrog., 0.0377 g. $H_2$/g. sample. Found: C, 90.55%, 90.25%; H, 9.57%, 9.50%; Quant. Hydrog., 0.0385, 0.0382 g. $H_2$/g. sample.

Example XIX.—Preparation of dimethyl 2,6(or 7)-dimethyl-$\Delta^{9,10}$-octalin-3,7(or 6)-dicorboxylate

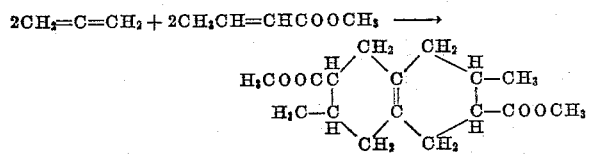

and/or

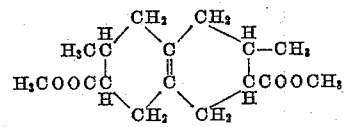

A mixture of 225 parts of methyl crotonate, 30 parts of allene and 1 part of hydroquinone is heated for 8 hours at 200° C. under autogenous pressure. On distillation of the reaction mixture, after removal of volatile material, there is obtained 35.2 parts of dimethyl 2,6(or 7)-dimethyl - $\Delta^{9,10}$ - octalin-3,7(or 6)-dicarboxylate. On recrystallization from a mixture of ethanol and water, this product is a white, waxy solid melting at 85–89.5° C.

*Analysis.*—Calcd. for $C_{16}H_{24}O_4$: C, 68.54%; H, 8.73%; Mol. wt., 280.4. Found: C, 68.33%; H, 8.73%; Mol. wt., 250.

As shown by the preceding examples, the products of this invention are of two classes. One class of these products comprises any methylenecyclobutane in which the annular carbon opposite the one at which the methylene group is attached (i.e., the carbon in the 3-position when the methylene group is attached to the carbon in the 1-position) carries an activating group, which activating group is characterized in that it is united to one annular carbon of the cyclobutane ring by a carbon which is in turn attached to another atom by a multiple bond. These products have the following general formula:

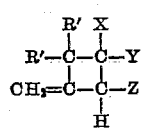

wherein X is COOH, COOR,

CN, $CONH_2$, or aryl; Y is H, alkyl, cycloalkyl, aryl, COOH, COOR,

CN, or $CONH_2$; Z is H, COOH, COOR,

CN, $CONH_2$, alkyl, or aryl; (X and Z taken together can be

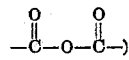

R' is H, alkyl, phenyl or an acetoxy methyl radical; and R is selected from the group consisting of hydrogen and a lower alkyl radical. Thus, in addition to the specific substituted methylenecyclobutanes mentioned above, the products of this invention include 3-methylenecyclobutanecarboxylic acid, 1-methyl-3-methylenecyclobutanecarboxamide, 1-acetyl-3-methylenecyclobutane and 3-methylenecyclobutanecarboxaldehyde. These particular compounds are prepared by reaction of allene with the following substituted ethylenes: acrylic acid, methacrylamide, and methyl vinyl ketone, respectively, under the conditions of the examples given above.

The second class of products of this invention comprises any $\Delta^{9,10}$-octalin having attached to the carbons in the 2 and 3-positions of the octalin ring at least one activating group, which activating group is characterized in that it is united to the annular carbon of the octalin ring by a carbon which is, in turn, attached to another atom by a multiple bond, having attached to the carbons in the 6 and 7-positions of the octalin ring the same number and kind of activating groups that are attached to the 2 and 3 carbons, the annular carbons in the 1, 4, 5 and 8-positions of the octalin ring being unsubstituted. These products have the following general formula:

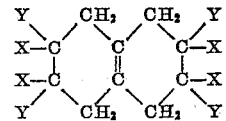

wherein X is COOH, COOR,

CN, $CONH_2$, or aryl; Y is H, alkyl, cycloalkyl, aryl, COOH, COOR,

CN, or $CONH_2$; and R is selected from the group consisting of hydrogen and a lower alkyl radical. The X's on adjacent carbons can be divalent activating groups characterized in that they are attached to the annular carbons of the octalin ring by two carbons each attached in turn by multiple bonds to another atom.

In addition to the allene and dimethylallene used in the examples, any allene of the formula

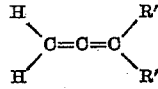

in which R' is hydrogen, alkyl, phenyl or an acetoxymethyl radical can be reacted with any substituted ethylene having an activating group attached to one of the doubly bonded carbons of the ethylenic linkage, said activating group being attached to one of the olefinic carbons by a carbon atom which is in turn attached to another atom by a multiple bond. Thus, 3-methylene-2-phenylcyclobutanecarbonitrile, 3-methylene-2,2-diethylcyclobutanecarbonitrile, and methyl 3-methylene-2,2-di-n-octylcyclobutanecarboxylate can be prepared respectively from the following reactions; acrylonitrile reacted with 1-phenylallene, acrylonitrile reacted with 1,1-diethylallene, and methyl acrylate reacted with 1,1-di-n-octylallene.

In place of hydroquinone and phenothiazine, other conventional addition of polymerization inhibitors which do not react with any of the reactants can be used in the process of this invention. Examples of other inhibitors which are operable include copper resinate, the naphthylamines and β-naphthol.

In addition to the copolymers illustrated by Examples V and VI, the substituted methylenecyclobutanes of this invention can be copolymerized with a wide variety of polymerizable ethylenically unsaturated compounds. Thus, they can be copolymerized with olefins, both aliphatic mono- and diolefins, e.g., ethylene, propylene, butylene, and butadiene; vinyl and vinylidene halides, e.g., vinyl fluoride and vinylidene chloride; vinyl esters, e.g., vinyl acetate, vinyl benzoate, vinyl laurate; vinyl ketones, e.g., methyl vinyl ketone, and methyl isopropenyl ketone; acrylic and methacrylic acids and their derivatives, such as esters, nitriles and anhydrides, e.g., ethyl acrylate, methyl methacrylate, acrylonitrile, methacrylic acid; butenedioic acids, and their derivatives, e.g., maleic and fumaric acids, their esters, nitriles, and anhydrides, substituted ethylenes, such as trifluoroethylene, chlorotrifluoroethylene and styrene.

The substituted methylenecyclobutanes of this invention are useful for a wide variety of purposes. For example, they are useful for the formation of polymers by addition polymerization. They are particularly useful for copolymerization with other copolymerizable monomers. The resulting polymers are useful as adhesives, coating compostions, films and the like. Those products of this invention having two functional groups, such as two carboxyl or carbalkoxy groups, are useful for modifying hydroxyl-containing polymers, such as polyvinyl alcohol, cellulose, and starch, and for modifying ethylene/carbon monoxide polyamines. The exocyclic double bond present in these methylenecyclobutanes is capable of reacting with many reagents that add to olefinic double bonds, for example, mercaptans, hydrogen bromide and hydrogen.

The polysubstituted $\Delta^{9,10}$-octalins of this invention are also useful for many purposes. For example, they are useful for reacting with complementary bifunctional reactants to form condensation polymers. These condensation polymers are useful as adhesives, coating compositions, films, and the like. The polysubstituted $\Delta^{9,10}$-octalins having carboxyl or carbalkoxyalkyl groups are useful for the formation of such condensation polymers as polyesters, polyamides and polyimides. The $\Delta^{9,10}$-octalins are also useful as chemical intermediates. For example, they can be hydrogenated to the corresponding saturated ring compounds by use of nickel alloy skeleton catalysts, and the polycyano compounds can be hydrogenated in the presence of carbon-supported palladium catalysts to the corersponding polyamines. Ester groups on the $\Delta^{9,10}$-octalins can be hydrogenated to hydroxyl groups by use of copper chromite catalysts.

As many apparently widely different embodiments of this invention may be made without departing from the spirit and scope thereof, it is to be understood that this invention is not limited to the specific embodiments thereof except as defined in the appended claims.

I claim:
1. 3-methylenecyclobutanecarbonitrile.
2. 3-methylenecyclobutane-1,2-dicarboxylic anhydride.
3. A process for preparing a methylene cyclobutane which comprises heating an allene of the formula

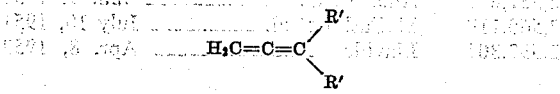

in which R' is selected from the group consisting of hydrogen, alkyl, phenyl, and acetoxymethyl with a substituted ethylene having attached to one of the doubly bonded carbons of the ethylenic linkage, a member of the group consisting of $$COOH, COOR, \overset{O}{\overset{\|}{C}}-R, CN, CONH_2$$

and aryl wherein R is selected from the group consisting of hydrogen and a lower alkyl radical, in the absence of a polymerization initiator, to a temperature of 150°–250° C.

4. A process for preparing a methylene cyclobutane which comprises heating an allene of the formula

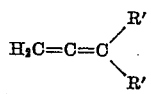

in which R' is selected from the group consisting of hydrogen, alkyl, phenyl, and acetoxymethyl with a substituted ethylene having attached to one of the doubly bonded carbons of the ethylenic linkage, a member of the group consisting of $$COOH, COOR, \overset{O}{\overset{\|}{C}}-R, CN, CONH_2$$

and aryl wherein R is selected from the group consisting of hydrogen and a lower alkyl radical, in the presence of a polymerization inhibitor, to a temperature of 150°–250° C.

5. A process for preparing a methylene cyclobutane which comprises heating in the absence of a polymerization initiator, a mixture of allene and acrylonitrile to a temperature of 150°–250° C.

6. A methylene cyclobutane of the following structural formula

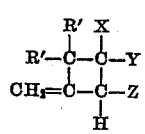

where X is a radical selected from the group consisting of $$COOH, COOR, \overset{O}{\overset{\|}{C}}-R, CN, CONH_2$$

and aryl; Y is selected from the group consisting of hydrogen, alkyl, cycloalkyl, aryl, $$COOH, COOR, \overset{O}{\overset{\|}{C}}-R, CN, \text{and } CONH_2$$

Z is selected from the group consisting of $$H, COOH, COOR, \overset{O}{\overset{\|}{C}}-R, CN, CONH_2$$

alkyl and aryl and X and Z jointly represent

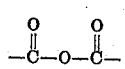

R' is selected from the group consisting of hydrogen, alkyl, phenyl and an acetoxymethyl radical, and R is selected from the group consisting of hydrogen and a lower alkyl radical.

(References on following page)

References Cited in the file of this patent

UNITED STATES PATENTS

| | | |
|---|---|---|
| 1,944,731 | Diels et al. | Jan. 23, 1934 |
| 2,406,657 | Bitler et al. | Aug. 27, 1946 |
| 2,537,873 | Allen et al. | Jan. 9, 1951 |
| 2,560,119 | McCaslin et al. | July 10, 1951 |
| 2,592,301 | Linville | Apr. 8, 1952 |

OTHER REFERENCES

Coffman et al.: J.A.C.S., vol. 71, p. 496 (1949).

Alder: Berichte, vol. 87, pp. 1567–71 (published Oct. 30, 1954).

UNITED STATES PATENT OFFICE
Certificate of Correction

Patent No. 2,914,541                                                     November 24, 1959

Harry Norman Cripps

It is hereby certified that error appears in the printed specification of the above numbered patent requiring correction and that the said Letters Patent should read as corrected below.

Column 7, lines 24 to 26, Example X, the left-hand portion of the formula should appear as shown below instead of as in the patent:

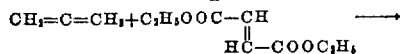

column 8, lines 13 to 16, Example XII, the right-hand portion of the formula should appear as shown below instead of as in the patent:

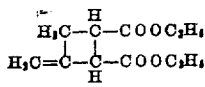

same column 8, line 72, for "C, 91.69%" read —C, 91.67%—; column 9, line 3, for "these" read —those—; column 10, lines 14 to 21, inclusive, Example XVII, Formula II should appear as shown below instead of as in the patent:

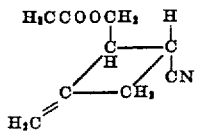

same column 10, line 33, for "61.71%" read —6.71%—; column 13, line 9, for "acrylnitrile" read —acrylonitrile—; line 14, strike out "of"; line 67, for "corersponding" read —corresponding—.

Signed and sealed this 5th day of July 1960.

[SEAL]

Attest:
KARL H. AXLINE,
*Attesting Officer.*

ROBERT C. WATSON,
*Commissioner of Patents.*